Patented Jan. 9, 1934

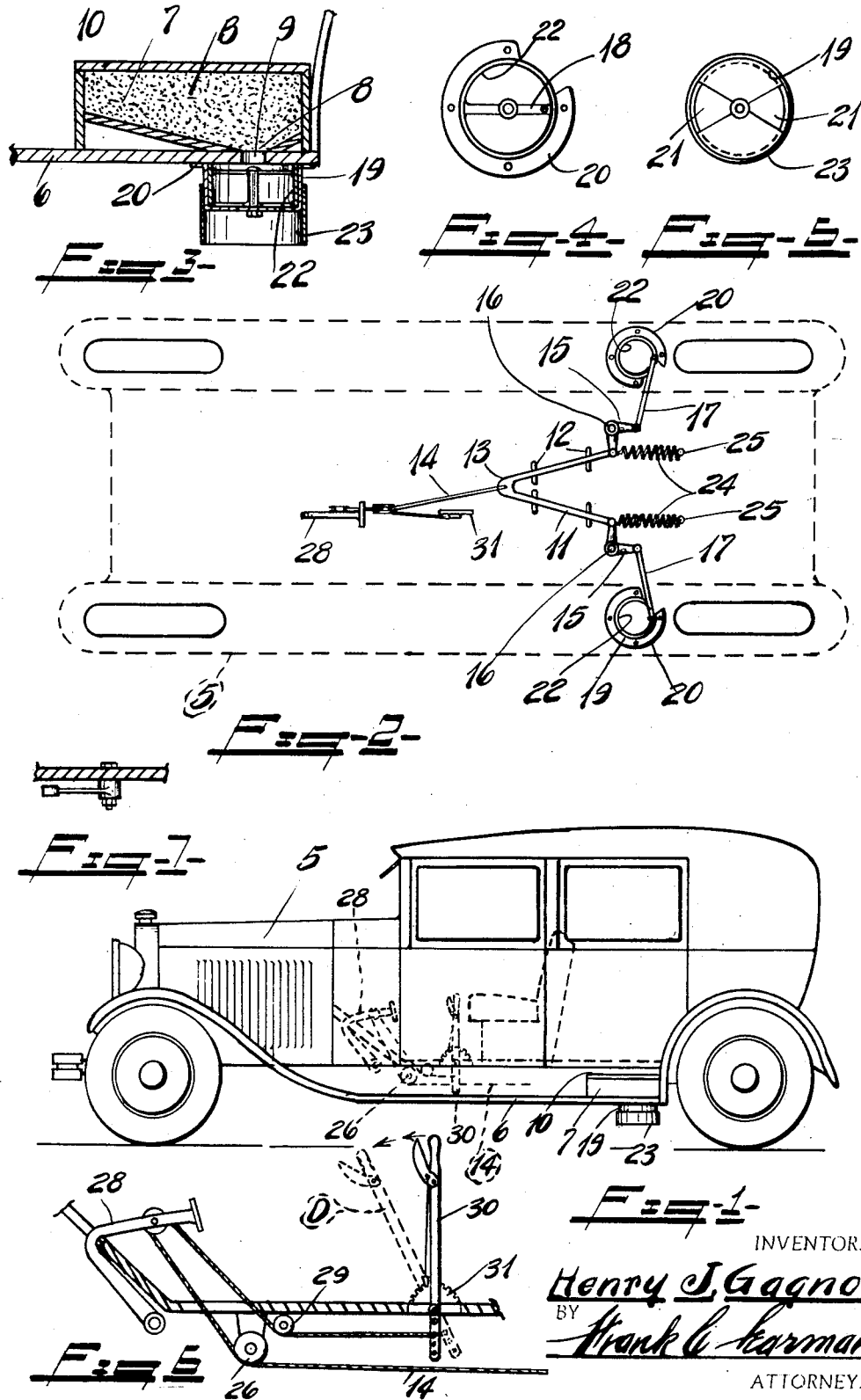

1,942,921

UNITED STATES PATENT OFFICE 1,942,921

SANDING DEVICE FOR AUTOMOTIVE VEHICLES

Henry J. Gagnon, Bay City, Mich., assignor of one-half to Flora Gagnon, Bay City, Mich.

Application March 26, 1932. Serial No. 601,371

2 Claims. (Cl. 291—32)

This invention relates to sanding devices, and more specifically to sanding devices inbuilt in an automotive vehicle, so that it can be automatically operated when the brakes are applied.

Another object is to design a sanding mechanism which can be either mechanically or manually operated for delivering sand to the surface of a road-bed directly ahead of the vehicle wheels, to prevent skidding on slippery surfaces.

A further object is to provide a sanding mechanism which can be readily manufactured and installed, which is of sturdy and substantial construction, and which is easy and practical to operate.

With the above and other objects in view, the present invention consists in the combination and arrangement of parts, hereinafter more fully described, illustrated in the accompanying drawing, and particularly pointed out in the appended claims, it being understood that changes may be made in the form, size, proportion, and minor details of construction, without departing from the spirit, or sacrificing any of the advantages of the invention.

In the drawing—

Fig. 1 is a side view of an automotive vehicle showing my sanding apparatus in place thereon.

Fig. 2 is an inverted plan view, the wheels and sanding mechanism being shown in solid lines.

Fig. 3 is an enlarged fragmentary longitudinal sectional view through the storage box and container.

Fig. 4 is an enlarged plan view of the container proper.

Fig. 5 is an inverted plan view.

Fig. 6 is an enlarged fragmentary view showing the connections to the brake pedal and the lever, the dotted lines showing the position of the mechanism when manually applied.

Fig. 7 is a detail side view of the pivot pin and bell crank.

In the drawing, the numeral 5 indicates an automotive vehicle of conventional design and to which my sanding apparatus is applied. The vehicle is, of course, provided with running boards 6 on the sides thereof, and a sand storage box or container 7 is mounted on each running board directly adjacent the rear wheel, the bottom of said container being inclined as shown, and an opening 8 is provided therein and registers with an opening 9 provided in the running board, a cover 10 forming a closure for the top of the container as usual.

Rods 11 are slidably mounted in clips 12 which are secured to the vehicle body, one end of each rod being secured to a head 13, and to which a cable member 14 is also connected, the opposite end of each rod being pivotally secured to one leg of a bell crank lever 15 which is pivotally mounted on the vertically disposed pin member 16.

A link member 17 is pivotally connected to the opposite leg of the bell crank lever 15, the opposite end of said link being pivotally connected to a valve arm 18 which is rotatably mounted in a preferably sheet metal container 19, and which is positioned directly below and in connection with the sand box, the upper end being open, and the edge is flanged as shown at 20 to facilitate securing it in position, said flange being cut away to accommodate the link 17.

The container 19 is preferably cylindrical in shape, spaced apart ports or openings 21 being provided in the bottom thereof, and a rotatable valve member 22 is mounted in said container and normally forms a closure for said ports, said valve being actuated to uncover these ports to permit the discharge of the sand "B" in a manner to be presently described.

A downwardly depending apron or skirt 23 is secured to each container and serves to shield the container and ports from mud and water thrown by the vehicle wheels, when it is operated in wet weather, and springs 24 are anchored to the bell cranks and to the vehicle body at the point 25 for forcing the valves back to closed position.

The cable 14 leads forwardly and around the sheave 26, which is mounted on the body 27, thence leading over a sheave provided on the brake pedal 28, thence back and over a sheave 29, and thence being anchored to the lower end of a lever 30 which is pivotally mounted on a quadrant frame 31, this lever and quadrant being of conventional design, so that it can be actuated in the usual manner, and when the lever is in position as shown in solid lines in Fig. 6 of the drawing, the sanding mechanism will be automatically operated to permit the discharge of sand when the brakes are applied, and when in position as shown in dotted lines in the same figure, the sanding mechanism can be manually actuated in exactly the same manner as is the emergency brake, and is not affected by the usual operation of the brakes, and when in extreme position as indicated at "D", the mechanism is adapted for operation the same as an emergency brake.

The device is simple, practical, and efficient; it provides an abrasive agent between the vehicle tires and the ice or other surface; and can be operated to suit the driving conditions encountered.

The sand boxes are so positioned that they can be easily and quickly loaded, the sand readily flows on the inclined surface, road clearance is preserved, the sand does not cake, and it in no manner detracts from the appearance of the vehicle.

From the foregoing description, it will be obvious that I have perfected a very substantial, practical, and inexpensive sanding mechanism, which can be inbuilt or added after the vehicle has been in use, and which is simple and efficient in operation.

What I claim is:

1. A sanding device for automobiles, comprising a sand box adapted to be mounted on the vehicle running board, a container secured to the running board and communicating therewith, a valve in said container, a bell crank pivotally mounted on the vehicle, a rod connecting one leg of said bell crank with the valve, flexible means connected to the opposite leg of the bell crank and trained over the vehicle brake pedal, and a manually actuated lever to which the end of said flexible means is anchored to permit either automatic or manual operation of said sanding device.

2. A sanding device for automobiles, comprising a sand box adapted to be mounted on the running board of the vehicle, a container secured to the running board and communicating with said box, a valve rotatably mounted in said container, rods mounted on the vehicle, flexible means connected thereto, said means being trained over the brake pedal and anchored to an adjustable lever, bell cranks pivotally mounted on the vehicle and to which the rods are connected, links connecting the bell crank and the valves, and resilient means anchored to the cranks and to the vehicle for drawing the mechanism back to original position after it has been actuated.

HENRY J. GAGNON.